Aug. 13, 1963  J. PEDERSEN  3,100,622
TURBINE GOVERNOR
Filed April 7, 1959  3 Sheets-Sheet 1
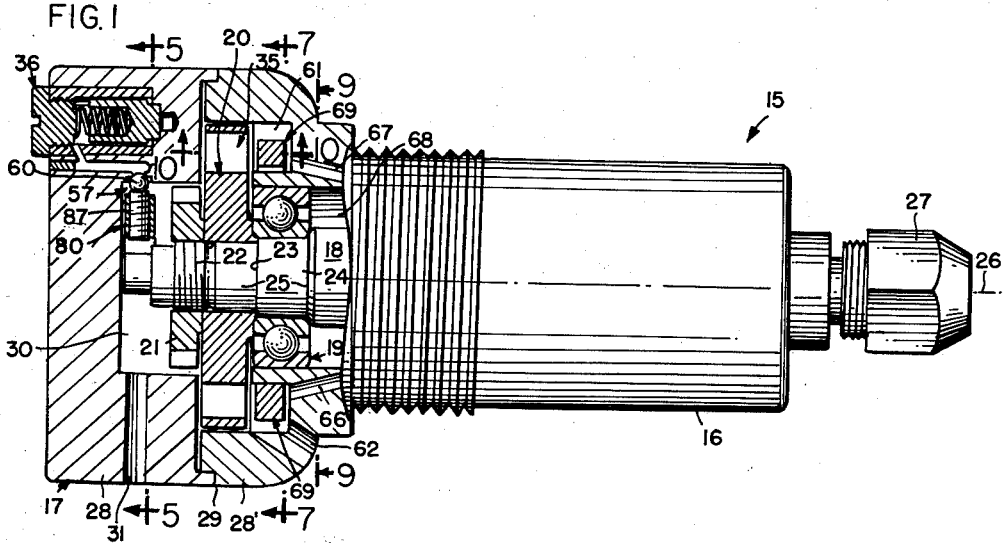
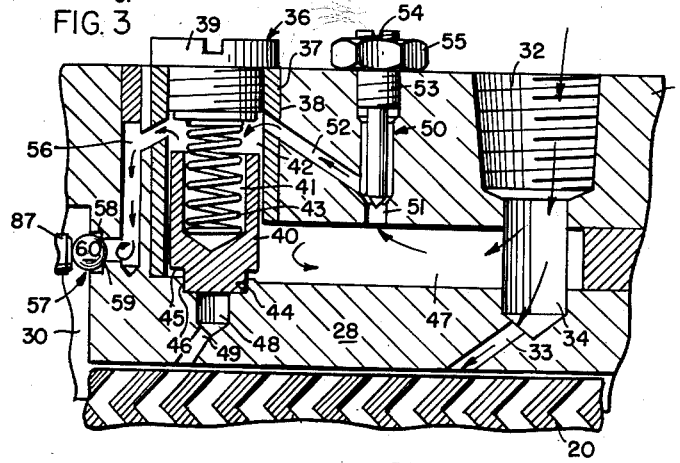
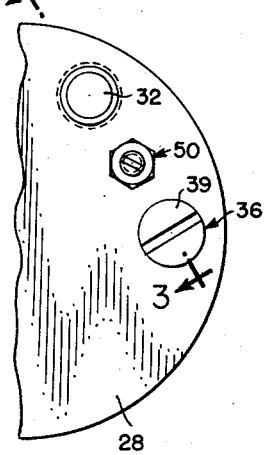
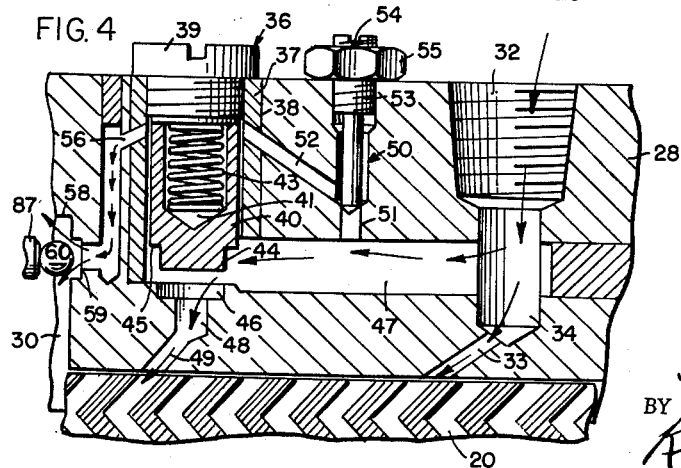
INVENTOR:
JOHN PEDERSEN
BY
ATT'YS

INVENTOR:
JOHN PEDERSEN

Aug. 13, 1963    J. PEDERSEN    3,100,622
TURBINE GOVERNOR

Filed April 7, 1959    3 Sheets-Sheet 3

INVENTOR:
JOHN PEDERSEN
BY
ATT'YS

United States Patent Office 3,100,622
Patented Aug. 13, 1963

3,100,622
TURBINE GOVERNOR
John Pedersen, Chicago, Ill., assignor to Onsrud
Machine Works, Inc., Niles, Ill.
Filed Apr. 7, 1959, Ser. No. 804,673
7 Claims. (Cl. 253—59)

This invention relates to a governor mechanism for regulating the flow of fluid driving the rotor element of a turbine type motor. More in particular this invention relates to a governor mechanism for automatically controlling the flow of driving fluid to a turbine rotor, independent of centrifugal force, to correspond substantially with the load applied to the rotor.

In United States Patent No. 2,641,441, issued on June 9, 1953, to Nilsen et al., there is described a means for controlling the input of driving fluid reespousive to the speed of the rotor, the actuating mechanism being operatively responsive to centrifugal force developed in accordance with the speed of the rotor. For some applications the regulating means is quite satisfactory particularly where rotor speeds of about 50,000 r.p.m. is desired. However when the rotor is operating under a non-load or idling condition the rotor may reach a speed as high as 80,000 r.p.m. but the governor does not function until a load is applied sufficient to reduce the speed to 50,000 r.p.m. Thus the governor's function is entirely dependent upon speed of the rotor and to change the speed at which the governor functioned required a change of the centrifugally responsive elements. Furthermore, for certain applications the sensitivity of the governor is not of sufficient magnitude to perform satisfactorily particularly in cases where the axis of the rotor is in a non-vertical position.

The present invention contemplates a low cost improved governor mechanism for turbine motors which may be employed in a much wider range of applications requiring different operating characteristics than has been heretofore possible.

A prime object of this invention is to provide a governor mechanism for turbine motors which is functionally dependent upon the load applied.

A further object of this invention is to provide a governor mechanism which is functionally independent of centrifugal force developed by the speed of the turbine rotor.

A still further object of the invention is to provide a governor mechanism for turbine motors which is highly sensitive to the magnitude of the load applied to the rotor.

A yet further object of the invention is to provide a highly sensitive governor mechanism for turbine motors which functions irrespective of the position of the rotor with reference to the vertical.

Another object of the invention is to provide a highly reliable governor mechanism for turbine motors according to the preceding objects at low cost with little or no danger of breakdown due to overstrained operating elements.

These and other desirable and important objects inherent in and encompassed by the invention will be more readily understood from the ensuing description of a preferred embodiment, the appended claims and the annexed drawings wherein:

FIGURE 1 is a side elevation, partly in section, illustrating a turbine motor driven tool embodying the invention.

FIGURE 2 is a plan view, partly broken away, showing the position of the fluid inlet port with respect to the control valve and adjusting valve therefor.

FIGURE 3 is a side view, in section, taken along the line 3—3 of FIGURE 2 illustrating the flow of fluid with respect to the control valve when the motor is operating under a no-load condition.

FIGURE 4 is the same as FIGURE 3 except that it illustrates the flow of fluid with respect to the control valve when the motor is operating under load condition.

Figure 5:
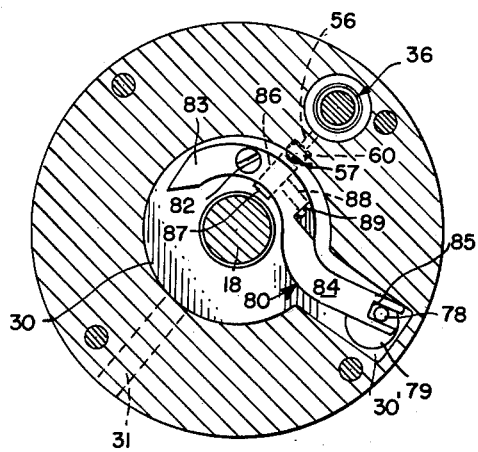
FIGURE 5 is a view looking upwardly, in section, taken along the line 5—5 of FIGURE 1 showing the position of the arm (associated with the actuator member) when the motor is operating under a no-load condition.

With continued reference to the drawings, the numeral 15 indicates generally a turbine driven tool fixture embodying the present invention. The fixture 15 is provided with a body 16 having a turbine motor head indicated at 17. Within the body 16 and motor head 17 is a rotatable shaft or spindle 18 supported by bearings one of which is indicated at 19. On the upper end portion of the shaft 18 is mounted in rigid relation a rotor indicated at 20. The rotor may be fixed to the shaft 18 by any means such as a nut 21 threadedly fit upon threads 22 disposed on the upper end of the shaft 18. The nut 21 frictionally engages the upper side of the rotor 20, the lower side of the rotor 20 being in abutting relation with a shoulder 23 on the shaft 18 formed by the portion 24 having an intermediate diameter with the small diameter portion 25. Thus the rotor 20 is secured to the shaft 18 rotatable on its axis. The lower end of the shaft 18 may be provided with a conventional tool gripping member such as a chuck 27. From this it can be seen that the rotor 20 is drivingly connected to the shaft 18 which in turn is drivingly connected to the chuck 27.

The turbine motor head 17 includes a housing which for manufacturing convenience may be in two members 28 and 28' connected together at 29 in rigid relation by any conventional means such as welding or by bolts (not shown). The housing member 28 is provided with an upper or first chamber 30 positioned above the rotor 20 and nut 21. Also the housing member 28 is provided with a transverse bore 31 communicatively connecting the upper chamber 30 with the atmosphere or other fluid return means (not shown).

Disposed on the upper portion on one side is port 32 (FIGURES 2 and 3) which is connected to a source of fluid pressure (not shown). The port 32 communicates directly with nozzle 33 through the passage designated at 34. The nozzle 33 is positioned to discharge fluid under pressure to the impeller blades indicated at 35 (FIGURE 10) at an angle approaching tangent to the upper surface of the rotor 20 so that fluid under pressure passing through the nozzle 33 impinges the blades 35 in a manner to urge rotation of the rotor 20. From this it is evident that when fluid under pressure is applied to the port 32 the rotor 20 will be urged to rotate by the movement of fluid under pressure in a manner known in the conventional art of turbines.

In the housing member 28 positioned laterally from the passage 34 is a fluid pressure operated valve generally indicated at 36. The valve 36 comprises a cylindrical sleeve 37 (FIGURE 3) fixedly mounted in a bore 38 in the housing member 28. The upper internal portion of the sleeve 37 is provided with threads adapted to threadedly fit a closure element or cap screw 39. Within the lower portion of the sleeve 37 in slidable relation is a valve closing element 40. The valve closing element 40 is provided with an internal recess 41 open at the upper end thereof. Thus the valve closing element 40 forms a cavity 42 with the sleeve 37 and cap screw 39.

Within the cavity 42 and extending within the recess 41 is a compression spring 43 abutting the lower surface of the stationary cap screw 39 and the valve closing element 40 thereby urging the closing element 40 downwardly. On the lower end of the valve closing element 40 there is provided a reduced diameter portion 44 forming an annular shoulder 45. In axial alinement with the closing element 40 there is provided in the housing 28 a recess 46 having a diameter adapted to slidably receive in seating relation the lower part of the reduced diameter portion 44 of the valve closing element 40.

The housing member 28 is also provided with a lateral passage 47 (FIGURE 3) extending through the sleeve 37 communicatively connecting fluid under pressure from the passage 34 to the valve closing element 40. Now below the recess 46 in the housing member 28 is a vertical passage 48 which communicates with a jet 49 which will be described later. Thus it may be seen that when the valve closing element 40 is in seating relation with the recess 46 of the housing member 28 as illustrated in FIGURE 3, fluid under pressure from the lateral passage 47 is precluded from entering the vertical passage 48 and jet 49. However when the valve closing member 40 is elevated to the position shown in FIGURE 4 it is unseated from the recess 46 thereby communicating fluid under pressure from the lateral passage 47 to the vertical passage 48 and jet 49. At this point it will be noted from FIGURE 3 that the annular shoulder 45 of the valve closing element 40 does not abut the housing member 28.

From FIGURES 3 and 4 it will be seen that the housing member 28 is provided with a conventional needle valve generally indicated at 50 for adjusting the rate of flow of fluid under pressure from the lateral passage 47 and bore 51 into the angularly disposed passage 52 in the housing member 28 leading to the cavity 42 of the fluid pressure operated valve 36. Adjustment of the needle valve 50 is conventionally accomplished by rotating its threaded shank 53 by a suitable tool such as a screw driver applied to the externally protruding slot 54. An externally locking nut 55 is provided on the upper end of the shank 53 to maintain the needle valve 50 fixedly in any desired position of adjustment.

Positioned in communicable relation with the upper or first chamber 30 (FIGURES 1 and 3) and the cavity 42 of the pressure operated valve 36 is a bleeder passage 56 in the housing member 28. At the point where the bleeder passage 56 enters the upper chamber 30 there is interposed a control valve generally indicated at 57. Conveniently the control valve 57 may be a ball valve comprised of a small recess 58 forming a shoulder or valve seat 59 positioned to receive the ball 60 in seating relation. It will be seen that in FIGURE 3 the ball 60 of the control valve 57 is in seated relation thereby preventing communication between the bleeder passage 56 and the chamber 30 while in FIGURE 4 the ball 60 is in unseated relation thereby communicating the bleeder passage 56 with the chamber 30. At this point it is convenient to explain the operation of the pressure operated valve 36.

When the control valve 57 is closed fluid under pressure from the lateral passage 47 entering the cavity 42 through the bore 51, needle valve 50 and the angularly disposed passage 52 results in an increased pressure in the cavity 42. This increased pressure in the cavity 42 exerts a downward force on the valve closing element 40 in a piston-like manner which force is augmented by the compression spring 43 to maintain the valve closing element 40 in seating relation with the recess 46 in the housing member 28. Now when the control valve 57 is opened by unseating the ball 60 the fluid pressure in the cavity 42 bleeds into the chamber 30 through the bleeder passage 56. The fluid in the chamber 30 is exhausted to the atmosphere or other return means through the transverse bore 31 (FIGURE 1) as explained previously. From this it can be seen that the fluid pressure in the cavity 42 is greatly reduced as compared with the fluid pressure in the lateral passage 47. The fluid pressure from the lateral passage 47 acting on the annular shoulder 45 of the valve closing element 40, forces the element 40 upwardly to overcome the compression spring 43 thereby unseating the valve element 40 from the position shown in FIGURE 3 to the position shown in FIGURE 4. Thus it may be seen that the closing of the control valve 57 results in the closing of the pressure operated valve 40 and vice versa.

The jet 49, like nozzle 33, is positioned to discharge fluid under pressure to the impeller blades indicated at 35 at an angle approaching tangent to the upper surface of the rotor 20 so that the fluid emerging from the jet 49 impinges the blades 35 in a manner to urge rotation of the rotor 20.

Figure 7:
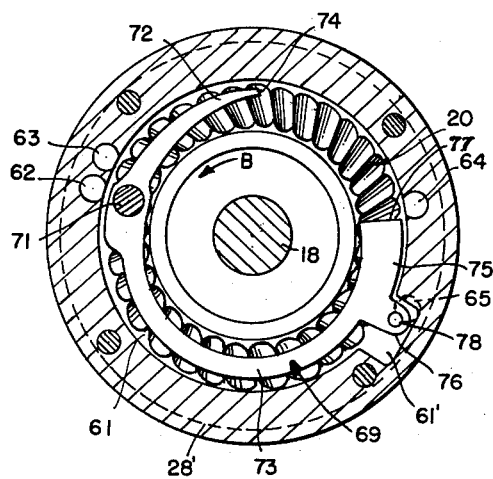
FIGURE 7 is a view looking upwardly, in section, taken along the line 7—7 of FIGURE 1 showing the position of the actuator member when the motor is operating under a no-load condition.
Figure 8:
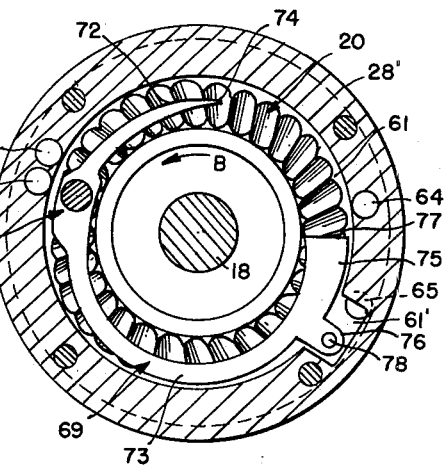
FIGURE 8 is the same as FIGURE 7 except it shows the position of the actuator member when the motor is operating under load condition.
Figure 9:
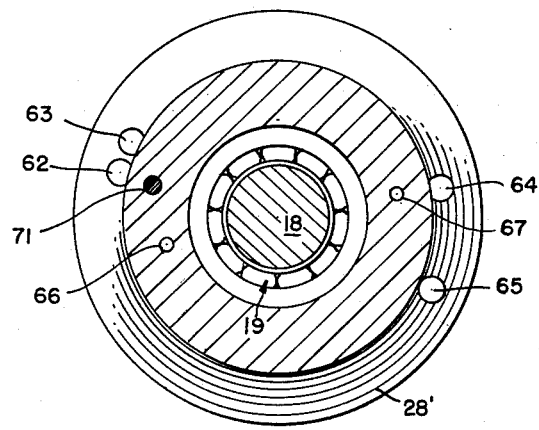
FIGURE 9 is a view looking upwardly, in section, taken along the line 9—9 of FIGURE 1 illustrating the relative positions of the exhaust ports in respect to the position of the actuator member.

The mechanism for governing the operation of the control valve 57 will now be described. In FIGURE 1 it will be seen that the housing 28' is provided with a lower or second chamber 61 adjacent the lower side of the rotor 20. The lower chamber 61, which is of substantially the same diameter as the space occupied by the rotor 20, is provided with port or outlet 62 for exhausting or discharging fluid after it has performed work upon the rotor 20. Referring to FIGURES 7, 8 and 9 it will be seen that additional outlet or exhaust ports are provided at 63, 64 and 65. For convenience in flushing the body 16 to prevent a vacuum or dirt collection in the opening 68 of the body 16 there is provided two flush ports 66 and 67 (FIGURES 1 and 9) communicating with the lower chamber 61 which also serves as fluid outlet or exhaust means.

Figure 11:
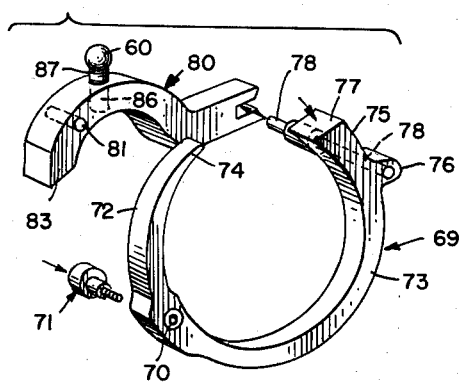
FIGURE 11 is a perspective view of the actuator member in relation to the valve operating arm illustrating their respective position to each other.

Within the lower chamber 61 of the housing 28' there is provided an actuator member generally indicated at 69 in FIGURES 1, 7, 8 and 11. The actuator member 69 is pivotally supported on one side thereof at 70 to the housing 28' at one side by any conventional means such as a pivot pin indicated at 71 threaded appropriately to a corresponding bore in the housing 28'. From this it can be seen that actuator member 69 may rotate about the pivot 70, 71 in a transverse direction to a limited degree within the lower chamber 61. Referring to FIGURES 7, 8 and 11 it will be seen that the actuator member 69 is provided with an arcuately shaped first projection 72 extending transversely on one side of the pivotal support 70, 71. The actuator member 69 is also provided with an arcuately shaped second projection 73 extending transversely on the opposite or other side of the pivotal support 70, 71. The first projection 72 is curved and tapered from the pivotal support 70, 71 to its extremity 74, for an important purpose to be described later, the curvature being such that in the "no load" position of FIGURE 7 the extremity 74 will lie closely adjacent the outer periphery of the rotor 20 and the body of the projection 72 will expose more of the fluid discharge areas of the rotor on the inside of the projection than on the outside thereof. Thus, under no load condition the main impinging force of the fluid discharged through the rotor will act to urge the projection 72 toward the outer wall of the lower chamber 61. The second projection 73 at the outer end thereof is provided with an enlarged portion 75 having a protruding ear 76. At the extreme outer end of the enlarged portion 75 of the actuator member 69 there is provided a vertically disposed face 77 for an important purpose to be described later. The width of this face 77 is made to be substantially as great as the radial width of the fluid discharge passages between the rotor blades. Also as shown in FIGURE 7 the second projection 73 is of much greater length than the first projection with a body portion, between the pivot pin 71 and the ear 76, formed to substantially follow a circular path centered on the axis of the rotor and midway of the radial width of the rotor passages when the parts are in the "no load" position. As shown, the radial width of the projection 73 is about one-half the radial width of the rotor passages and sufficiently narrow to permit movement of the projection 73 to the "loaded" position of the actuator shown in FIGURE 8.

Referring now to FIGURES 7 and 8 it will be seen that the lower chamber 61 is generally annularly shaped except that on one side thereof is a small groove or radially extending recess 61′ in the wall of the chamber 61 sufficiently large enough to accommodate the ear 76 of the actuator member 69 which serves as a stop means for limiting the transverse movement of the actuator member 69 about its pivotal support 70, 71. FIGURE 7 illustrates one transverse position of the actuator member 69 with respect to its pivotal support 70, 71 while FIGURE 8 its opposite position. Thus the actuator member 69 disposed within the lower chamber 61 and 61′ has been described including its limiting transverse movement about its pivotal support 70, 71.

Figure 6:
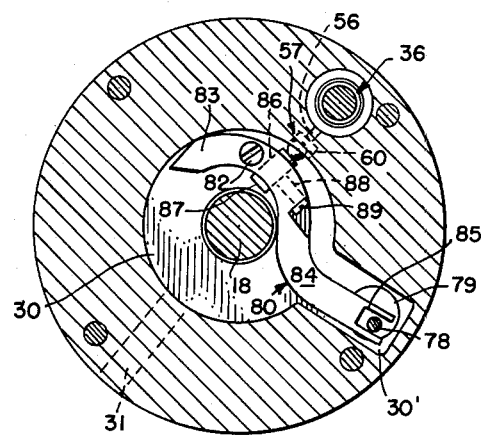
FIGURE 6 is the same as FIGURE 5 except it shows the position of the arm (associated with the actuator member) when the motor is operating under load condition.

Disposed on the ear 76 of the actuator member 69 in rigid relation is a drive pin 78 extending in an upward direction therefrom into an axially aligned recess 30′ extending radially from the upper chamber 30, the pin 78 passing through a large vertical bore 79 extending between the recesses 30′ and 61′ in the housing 28, 28′ as best shown in FIGURES 5 and 6. Thus the transverse movement of the actuator member 69 oscillates arcuately the drive pin 78 extending into the upper chamber recess 30′.

Now referring to FIGURES 5 and 6 it will be seen that the upper chamber 30 is generally annularly shaped except it is provided with the radial slot or recess 30′ in its side wall. Within the upper chamber spaces 30, 30′ is disposed an arm indicated at 80. The arm 80 is provided with a bore 81 (FIGURE 11) for reception of a pivot pin 82 (FIGURES 5 and 6) threadedly fit into a bore appropriately disposed in the upper portion of the housing 28. Thus the arm 80 is pivotally supported for arcuate movement in a transverse direction about the pivot pin 82. Extending on one side of the pivot pin 82 the arm 80 is a protruding portion 83 which serves as a counterbalance. Extending from the opposite or other side of the pivot pin 82 the arm is provided with a lever portion 84 extending into the recess 30′. At the extreme outer end portion of the lever 84 is an elongated slot or bifurcation 85 positioned in engaging relation with the drive pin 78. Since the pivotal support 70, 71 of the actuator member 69 might not necessarily be in the same plane as the pivot 82 of the arm 80, the elongated slot 85 accommodates the lost motion due to the difference in the arcuate movement of the drive pin 78 with respect to the arcuate movement of the slot 85. From this it can be seen that transverse movement of the actuator member 69 about its pivotal support 70, 71 is translated to corresponding transverse movement of the arm 80 about its pivotal support 82.

As will be seen from FIGURES 5 and 6, the arm 80 is provided with a threaded transverse bore 86. Threadedly fit within the bore 86 is a valve pin 87 positioned in abutting relation with the ball 60 of the control valve 57. For convenience, if desired, the valve pin 87 may be maintained in an adjusted position by providing in the arm 80 a threaded bore 88 bearing a conventional set screw 89 positioned to frictionally abut the valve pin 87 transversely. Thus from FIGURES 1, 3, 4, 5 and 6 it will be seen that the arcuate movement of the arm 80 about its pivotal support 82 regulates the movement of ball 60 of the control valve 57 with respect to the valve seat 59 for controlling the flow of fluid through the bleeder passage 56.

Having now described the construction of a preferred embodiment of the invention, the operation of the governor mechanism thereof will now be described.

*Operation*

Figure 10:
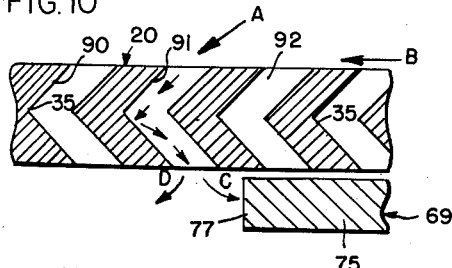
FIGURE 10 is a longitudinal section of the rotor illustrating the contour of the rotor impeller blades in relation to the position of the actuator member.

In order to describe the operation of the governor mechanism of this invention it is first necessary to illustrate and explain the basic principle upon which this invention is predicated. Reference is therefore made to FIGURE 10 which illustrates a vertical cross-section of a portion of the rotor 20 showing the V-shaped impeller blades or vanes 35. Fluid under pressure from the nozzle 33 and jet 49 impinges the vanes or impeller blades 35 in the general direction indicated by the arrow A adjacent the upper side of the rotor 20. As the fluid under pressure impinges the impeller blades 35 the direction of flow of the fluid through the vanes is altered. This alteration in direction of flow of fluid performs work upon the rotor urging movement thereof in the direction of the arrow B (FIGURES 7, 8 and 10). Now when the rotor 20 is stationary the fluid emanating through the impeller blades 35 moves in the other direction as indicated by the arrow C in FIGURE 10. Thus when the rotor 20 is stalled the flow of fluid in the lower chamber 61 moves clockwise as viewed in FIGURES 7 and 8. Now if the rotor 20 is free to rotate in the direction of the arrow B then as the speed of the rotor increases the direction of flow of fluid in the lower chamber 61 will begin to move in a counter-clockwise direction, the same direction as the rotor 20. The reason for the shift in the direction of fluid flow from that indicated by arrow C to the arrow D may not be apparent from a static condition indicated in FIGURE 10 as compared to the condition when the rotor 20 is moving in the direction of arrow B. However, upon consideration (when the rotor 20 is moving in the direction of the arrow B) of a small incremental volume of fluid entering the vane 91 its course of travel through the vane 91 as shown by the arrows, will require a period of time before it discharges from the vane 91 at the lower side of the rotor 20. During this same period of time the vane 91 will have moved in the direction of the arrow B to a new position such as that for example occupied by vane 90 in FIGURE 10. This movement of the incremental volume of air in the vane 91 has momentum imparted to it by the vane 91 in the direction of arrow B so that upon discharge from the vane 91 into the lower chamber 61 it will move in the chamber in the direction indicated by the arrow D. Thus when the rotor 20 rotates counter-clockwise (FIGURES 7 and 8) at a rapid rate the flow of fluid in the chamber 61 will also be in a counter-clockwise direction. It is this change in direction of fluid movement in the chamber 61 governed by the speed of the rotor that is applied to actuate the governor mechanism of this invention. For this reason it is preferable that the vanes of the rotor 20 have a V-shaped cross-section rather than a different shape such as the bucket shape type. Having the above basic principle in mind the operation of the governor mechanism will now be described.

It has been previously stated that the nozzle 33 is always in communication with the source of fluid pressure entering the turbine 15 at port 32. Assuming that no load is applied to the shaft 18, the rotor 20 will rotate freely under the influence of the fluid pressure from the single nozzle 33. Now referring to FIGURES 1 and 7 the fluid emanating from the lower side of the rotor 20 into the lower chamber 61 moves in the same direction as the rotor. This movement of fluid in the chamber 61 toward outlet ports 62 and 63 impinges the first projection 72 of the actuator member 69 urging rotation thereof about the pivot 70 in a counter-clockwise direction as viewed in FIGURE 7. This movement of the actuator member 69 urges movement of the drive pin 78 connected to the ear 76 in a counter-clockwise direction to the position illustrated in FIGURE 7. Now referring to FIGURE 5 it will be seen that the drive pin 78 translates motion to the arm 80 also in a counter-clockwise direction about its pivot 82. This counter-clockwise movement of the arm 80 advances the valve pin 87 into engagement with the ball 60 of the control valve 57 thereby seating it against the valve seat 59 in the small recess 58 of the housing 28 as best shown in FIGURE 3. Thus the control valve 57 is closed which terminates flow of fluid in the bleeder passage 56, and thereby closes the fluid pressure operated valve 36 as previously explained. From this it is apparent that under no load condition of the rotor 20 (idling) there is no fluid flow in the jet 49 as indicated best in FIGURE 3, and the rotor speed will be at its maximum as determined by the pressure of the driving fluid supplied by the nozzle 33.

Now suppose that the moving rotor 20 is loaded such as for example in intermittent grinding or routing operations where a grinding wheel or a router bit is provided in the chuck 27. The increased load on the rotor 20 retards its speed. When the speed of the rotor 20 has been reduced sufficiently to reverse the direction of fluid flow in the chamber 61 from the counterclockwise direction to the clockwise direction as previously explained, the fluid in the chamber 61 no longer impinges the inside wall of the first projection 72 of the actuator member 69 but instead acts with greater force on the outside wall of the projection 72 and also impinges on the face 77 of the second projection 73 of the actuator member 69 as the fluid moves toward the outlet ports 64 and 65. The force of the impinging fluid against the face 77 urges movement of the actuator member 69 in a clockwise direction about its pivot 70 to the position illustrated in FIGURE 8. The drive pin 78 connected to the ear 76 of the actuator member 69 also moves in a clockwise direction. Referring now to FIGURE 6 it will be seen that the drive pin 78 translates motion to the arm 80 in a clockwise direction about the pivot 82. This movement of the arm 80 retracts the valve pin 87 thereby permitting the fluid pressure in the bleeder passage 56 to unseat the ball 60 of the control valve 57 from the seat 59 in the small recess 58 of the housing 28. The opening of the control valve 57 permits discharge of fluid therethrough into the upper chamber 30 for exhaust through the transverse bore 31 (FIGURES 1 and 8). The opening of the control valve 57 in turn opens the fluid pressure operated valve 36 as shown in FIGURE 4 thus communicating jet 49 with the source of fluid pressure as explained before. Thus it will be seen that when the rotor 20 is under load condition both nozzle 33 and jet 49 direct fluid under pressure to the rotor 20 thereby providing maximum driving force for the rotor.

When the load on the rotor 20 is removed it will increase its speed under the influence of both the nozzle 33 and jet 49 until the direction of fluid flow in the chamber 61 is again reverted to the counter-clockwise direction at which time the actuator member 69 and the arm 80 shifts to close the control valve 57 as explained above. As stated previously the closing of the control valve 57 also closes the pressure operated valve 36 thereby terminating flow of fluid into the jet 49.

From the foregoing it can be appreciated that the tapered shape of the first projection 72 (FIGURES 7 and 8) of the actuator member 69 provides a relatively large surface area in the path of the moving fluid, flowing to the outlet ports 62—63, so that the impingement force thereon in the counter-clockwise direction will be greater than any back pressure in clockwise direction against the face 77. The additional force in the counter-clockwise direction of fluid flow is necessary to the actuator member 69 because the ball 60 of the control valve 57 must be forcibly seated against opposing fluid pressure in the bleeder passage 56. On the other hand to open the control valve 57 requires relatively little force from the actuator member 69.

It will be observed from FIGURES 5 and 6 that a protruding portion 83 is provided on the arm 80. This portion 83 serves to limit the pivotal movement of the arm 80. The portion 72—74 also serves for counter-balancing the weight of the actuator member 69 and the arm 80. If it is desired to operate the turbine motor wherein the axis of the spindle 18 is in a non-vertical position such as, for example, a horizontal position, it will be seen from FIGURE 7, that the actuator member 69 would assume by gravity the position shown in FIGURE 8 (or vice versa if the entire turbine is rotated 180°). However, the projection 72 of the actuator 69, as a counter-balance with the fluid force normally imparted thereto, will keep the lever portion 84 always under control of the actuator member 69. Thus the actuator member 69 and drive pin 78 with the associated arm 80 are always in balance, when the turbine is operating, so as to function as a precise governor in any position of the mechanism with reference to the vertical.

Having thus described a preferred embodiment of the invention it can now be seen that the objects of the invention have been fully achieved and it must be understood that changes and modifications of the construction shown may be made without departing from the spirit of the invention, nor from the scope thereof, as defined in the appended claims.

I claim:
1. A turbine having a housing and a rotor, said rotor having V-shaped impeller blades radially disposed in the peripheral portion thereof, a source of fluid under pressure and return means therefor, a jet in said housing positioned to direct said source of fluid under pressure to impinge the blades on the upper side of said rotor and discharged therethrough to the lower side thereof, valve means disposed in said housing operable to regulate the flow of fluid under pressure from said source to said jet, an actuator member disposed adjacent the lower side of said rotor, said actuator member being positioned and pivotally supported on one side by said housing for free swinging arcuate movement transversely with respect to the axis of said rotor, said member having a first projection positioned to urge transverse movement thereof in one direction responsive to impingement of said discharge fluid moving substantially in the direction of said rotor, said actuator member having a second projection positioned to urge transverse movement thereof in the other direction responsive to impingement of said discharge fluid moving substantially opposite to the direction of said rotor, an arm pivotally mounted on one end portion thereof to said housing and positioned for arcuate movement transversely with respect to the axis of said rotor, means mounted on said actuator member for operatively engaging the other end portion of said arm for moving said arm concurrently with movement of said actuator member, said valve means being positioned in operative relation with said arm for closing said valve means when said actuator member is moved in one direction responsive to impingement of discharge fluid moving in substantially the same direction of said rotor and alternately opening said valve means when said actuator member is moved in the other direction responsive to impingement of discharge fluid moving in the said substantially opposite direction thereby governing the flow of fluid under pressure in said jet.

2. For a turbine having a housing and a rotor of the kind described propelled by a stream of fluid under pressure issuing from a jet and impinging the upper side of said rotor and discharged therethrough axially to the lower side thereof, a governor mechanism comprising an actuator member disposed adjacent to the discharge side of said rotor, said actuator member being positioned and pivotally supported on one side of said housing for free swinging arcuate movement transversely with respect to the axis of said rotor, said member having a first projection positioned to urge transverse movement of said member in one direction responsive to impingment of said discharge fluid moving substantially in the direction of said rotor, said member having a second projection positioned to urge transverse movement of said member in the other direction responsive to impingment of said discharge fluid moving in a direction substantially opposite to said rotor, a valve mounted in said housing operable to regulate the flow of fluid under pressure from said jet, and means mounted on said actuator member in operative relation with said valve for closing said valve when said actuator member is moving in one direction responsive to flow of discharge fluid moving in substantially the same direction of said rotor and alternately opening said valve when said actuator member is moved in the other direction responsive to flow of discharge fluid in the said opposite direction thereby governing the flow of fluid from said jet.

3. For a turbine having a housing and a rotor of the kind described propelled by a stream of fluid under pressure issuing from a jet and impinging the upper side of said rotor and discharged therethrough axially to the lower side thereof, the discharged fluid moving substantially in the direction of said rotor at one speed thereof and moving in the opposite direction at a slower speed of said rotor, a governor mechanism comprising an actuator member disposed adjacent to the discharge side of said rotor, said actuator member being positioned and pivotally supported on one side by said housing for free swinging arcuate movement transversely with respect to the axis of said rotor, means on said actuator member for responsively urging arcuate movement of said member substantially in a direction concurrent with the direction of flow of fluid discharged from said rotor, a valve mounted in said housing operable to regulate the flow of fluid under pressure from said jet, and means mounted on said actuator member in operative relation with said valve for closing said valve when said actuator member is moved in one direction responsive to flow of discharge fluid moving in substantially the direction of said rotor and alternately opening said valve when said actuator member is moved in the other direction responsive to flow of discharge fluid in the opposite direction thereby governing the flow of fluid from said jet.

4. A governor mechanism comprising in combination with a vertically disposed rotor having impeller blades V-shaped in transverse section and propelled by a stream of fluid under pressure impinging on one side of the rotor and being discharged axially from the other side of the rotor, the discharged fluid moving substantially in the direction of said rotor at one speed thereof and moving in the opposite direction at a slower speed of said rotor, an actuator member pivotally mounted adjacent the other side of said rotor for free swinging movement transversely with respect to the rotor axis, said member having a first projection positioned to urge movement of said member in one direction responsive to impingement on said projection of said discharged fluid moving in substantially the same direction as said rotor and a second projection positioned to urge movement of said member in the opposite direction responsive to impingement on said second projection of said discharged fluid moving in a direction substantially opposite to said rotor, and a valve operatively controlling said stream of fluid, said valve being in operative relation with said actuator member whereby said valve is operated toward a closed position in response solely to impingement of discharged fluid on said first projection and alternately operated toward an open position responsive solely to impingement of discharged fluid on said second projection.

5. A governor mechanism comprising in combination with a vertically disposed rotor having V-shaped impeller blades propelled by a stream of fluid under pressure impinging on one side of the rotor and being discharged axially from the other side of the rotor, the discharged fluid moving substantially in the direction of said rotor at one speed thereof and moving in the opposite direction at a slower speed of the rotor, an actuator member pivotally mounted for free swinging movement transversely with respect to the rotor axis adjacent the other side of said rotor, said member having a first projection positioned to urge movement of the member in one direction responsive to flow of discharged fluid moving in substantially the same direction as said rotor and a second projection positioned to urge movement of said member in the opposite direction responsive to flow of discharged fluid moving substantially opposite to said rotor, and means operatively responsive to said actuator member for regulating the flow of pressure fluid in said stream whereby said regulating means is caused to decrease flow of pressure fluid in said stream responsive to urging of said first projection and alternately to increase flow of pressure fluid in said stream responsive to the urging of said second projection.

6. A governor mechanism comprising in combination with a rotor having V-shaped impeller blades propelled by a stream of fluid under pressure impinged on one side thereof and discharged axially from the other side thereof, the discharged fluid moving substantially in the direction of said rotor at one speed thereof and moving in the opposite direction at the slower speed of said rotor, an actuator member pivotally supported for free swinging transverse movement relative to the rotor axis adjacent the other side of said rotor, means on said actuator member for responsively urging pivotal movement thereof substantially in a direction concurrent with the direction of flow of fluid discharged from said rotor, and means operatively responsive to the movement of said actuator member for regulating the volume of the pressure fluid in said stream impinging on said one side of said rotor.

7. A turbine, means for sensing the speed of said turbine, said turbine including an inlet which receives a flow of fluid, the direction of discharge of the exhaust stream of said turbine varying with the speed thereof, said means comprising a vane receiving the exhaust flow from the turbine, means for freely pivotally mounting said vane downstream of said turbine whereby the vane assumes a position determined by the direction of exhaust flow from the turbine, and signal means responsive to the position of said vane for regulating the speed of said turbine.

References Cited in the file of this patent

UNITED STATES PATENTS

| 2,244,479 | Anderson | June 3, 1941 |
| 2,677,273 | Johnson | May 4, 1954 |
| 2,816,731 | Dantowitz | Dec. 17, 1957 |

FOREIGN PATENTS

| 337,425 | Germany | Oct. 12, 1920 |
| 929,668 | Germany | June 30, 1955 |